(12) United States Patent
Kubo et al.

(10) Patent No.: US 12,227,298 B2
(45) Date of Patent: Feb. 18, 2025

(54) SAFETY DEVICE, AND FLYING VEHICLE PROVIDED WITH SAFETY DEVICE

(71) Applicant: NIPPON KAYAKU KABUSHIKI KAISHA, Tokyo (JP)

(72) Inventors: Dairi Kubo, Tokyo (JP); Hiroshi Nakamura, Tokyo (JP); Yasuhiko Yagihashi, Tokyo (JP); Hideki Otsubo, Tokyo (JP)

( * ) Notice: Subject to any disclaimer, the term of this patent is extended or adjusted under 35 U.S.C. 154(b) by 94 days.

(21) Appl. No.: 17/906,077

(22) PCT Filed: Mar. 2, 2021

(86) PCT No.: PCT/JP2021/007874
§ 371 (c)(1),
(2) Date: Sep. 12, 2022

(87) PCT Pub. No.: WO2021/192848
PCT Pub. Date: Sep. 30, 2021

(65) Prior Publication Data
US 2023/0116018 A1   Apr. 13, 2023

(30) Foreign Application Priority Data
Mar. 26, 2020   (JP) .................................. 2020-056110

(51) Int. Cl.
*B64D 17/80* (2006.01)
*B64C 27/00* (2006.01)
(Continued)

(52) U.S. Cl.
CPC ............ *B64D 17/44* (2013.01); *B64C 27/006* (2013.01); *B64D 17/62* (2013.01); *B64D 17/725* (2013.01); *B64D 17/80* (2013.01); *B64U 70/83* (2023.01)

(58) Field of Classification Search
CPC ...... B64D 17/70; B64D 17/72; B64D 17/725; B64D 17/80; B64C 27/006; B64U 70/83
See application file for complete search history.

(56) References Cited

U.S. PATENT DOCUMENTS 1,019,585 A * 3/1912 Barnes ................... A43B 21/39
36/42
3,442,474 A * 5/1969 Foster .................. B64D 17/725
102/336
(Continued)

FOREIGN PATENT DOCUMENTS

| JP | 2020-1680 A | 1/2020 |
|----|----|----|
| JP | 2020 001680 A | 1/2020 |
| WO | 2020/004426 A1 | 1/2020 |

OTHER PUBLICATIONS

ISR; Japan Patent Office; Tokyo; May 18, 2021.
European Supplementary Search Report; Japan Patent Office; Munich; Feb. 23, 2024.

*Primary Examiner* — Nicholas McFall
(74) *Attorney, Agent, or Firm* — Patshegen IP; Moshe Pinchas

(57) ABSTRACT

There is provided a safety apparatus including a push-up member in which an ejected object is hardly displaced even during transportation, and an aerial vehicle including the safety apparatus. A safety apparatus 100 includes a cylinder 14 that accommodates a piston member 10 and is provided with a bore 13 through which the piston member 10 protrudes to the outside (upward in FIG. 1) during operation, a push-up member 15 that is pushed up in one direction by the piston member 10, an ejected object 16 that is pushed up while being supported by the push-up member 15, a gas generator 17 as a power source that moves the piston member 10 in the cylinder 14, a container 18 that has a bottomed cylindrical shape and accommodates the piston (Continued)

member 10, the cylinder 14, the push-up member 15, the ejected object 16, and the gas generator 17, and a lid 21 that closes an opening end of the container 18. A movement preventing member 27 that prevents the ejected object 16 from moving in a circumferential direction of a bottomed cylindrical portion 19 is provided on an upper surface of a support 20 of the push-up member 15.

8 Claims, 5 Drawing Sheets

(51) Int. Cl.
  *B64D 17/44* (2006.01)
  *B64D 17/62* (2006.01)
  *B64D 17/72* (2006.01)
  *B64U 70/83* (2023.01)

(56) References Cited

U.S. PATENT DOCUMENTS

| 4,050,657 A | * | 9/1977 | Murphy | B64D 17/80 |
|---|---|---|---|---|
| | | | | 244/147 |
| 2016/0221681 A1 | | 8/2016 | Babovka | |
| 2016/0251083 A1 | | 9/2016 | Tsaliah | |
| 2016/0318615 A1 | | 11/2016 | Pick | |

\* cited by examiner

SAFETY DEVICE, AND FLYING VEHICLE PROVIDED WITH SAFETY DEVICE

TECHNICAL FIELD

The present invention relates to a safety apparatus that ejects an ejected object such as a parachute or a paraglider, and relates to an aerial vehicle including the safety apparatus.

BACKGROUND ART

In recent years, with the development of an autonomous control technology and a flight control technology, an industrial use of an aerial vehicle provided with a plurality of rotor blades called a drone, for example, has been accelerating. The drone flies, for example, by simultaneously rotating a plurality of rotor blades in a well-balanced manner, ascends and descends by increasing or decreasing a rotation speed of the rotor blades, and can advance and retreat by tilting an airframe by increasing and decreasing the rotation speed of the rotor blades. Such aerial vehicles are expected to spread worldwide in the future.

Meanwhile, the risk of fall accidents of the aerial vehicles as described above is considered to be dangerous and hinders spread of the aerial vehicles. In order to reduce the risk of such fall accidents, safety apparatuses have been commercialized.

As the safety apparatus, Patent Literature 1 discloses a safety apparatus including a sliding member, a cylinder that accommodates the sliding member in an inside and is provided with a bore through which the sliding member protrudes from the inside to an outside during operation, a push-up member including a bottomed cylindrical portion disposed to cover at least a part of the cylinder and a flange protruding to the outside from an opening or a midway of a side surface of the bottomed cylindrical portion, the push-up member being pushed up in one direction by the sliding member, an ejected object that is pushed up while being supported by the flange of the push-up member, and a power source that moves the sliding member in the cylinder to protrude from the inside to the outside.

CITATION LIST

Patent Literature

Patent Literature 1: US 2016/0221681 A

SUMMARY OF INVENTION

Technical Problems

However, in the safety apparatus of Patent Literature 1, when the ejected object is a parachute or the like, there is a possibility that the ejected object is displaced in a circumferential direction of the bottomed cylindrical portion of the push-up member on the flange of the push-up member due to vibration or the like during transportation, and it could be impossible to maintain an initial state of the ejected object (for example, a state preferable for deployment with the parachute or the like folded and installed initially). In this case, it is difficult to deploy the ejected object during operation of the safety apparatus, and the deployment of the ejected object may be delayed until completion as compared with when the ejected object is not displaced.

Therefore, an object of the present invention is to provide a safety apparatus including a push-up member in which an ejected object is hardly displaced even during transportation, and an aerial vehicle including the safety apparatus.

Solutions to Problems (1) A safety apparatus of the present invention includes a sliding member, a cylinder that accommodates the sliding member in an inside and is provided with a bore through which the sliding member protrudes from the inside to an outside during operation, a push-up member including a bottomed cylindrical portion disposed to cover at least a part of the cylinder and a flange protruding to the outside from an opening or a side surface of the bottomed cylindrical portion, the push-up member being pushed up in one direction by the sliding member, an ejected object that is pushed up while being supported by the flange of the push-up member, a power source that moves the sliding member in the cylinder to protrude from the inside to the outside, and at least one movement preventing member that is fixed to the flange and prevents the ejected object from moving in a circumferential direction of the bottomed cylindrical portion.

(2) In the safety apparatus according to (1), preferably, the movement preventing member is a member having a plate shape and having a substantially triangular shape with an opposite side fixed to at least a part of the bottomed cylindrical portion and an adjacent side fixed to at least a part of the flange, a substantially L-shaped member having a first rod and a second rod, the first rod being fixed to at least a part of the bottomed cylindrical portion and the second rod being fixed to at least a part of the flange, or a protruding member fixed to the bottomed cylindrical portion and protruding radially from the bottomed cylindrical portion.

(3) In the safety apparatus according to (2), the substantially triangular shape preferably has an oblique side that is a linear shape, a stair shape, a substantially fan shape, or a substantially cycloidal curve shape.

(4) In the safety apparatus according to any one of (1) to (3), a plurality of the movement preventing members is preferably provided to be rotationally symmetric about the bottomed cylindrical portion.

(5) In the safety apparatus according to (1) to (4), the flange is preferably provided with at least one through hole.

(6) As another aspect, in the safety apparatus according to (4), the flange is preferably provided with at least one through hole in every space between the plurality of movement preventing members.

(7) In the safety apparatus according to (5) or (6), a plurality of the through holes is preferably provided, a coupling member preferably has a first end coupled to the ejected object, and the coupling member preferably has a second end coupled to the flange through two or more of the plurality of through holes.

(8) An aerial vehicle of the present invention includes an airframe, the safety apparatus according to any one of claims 1 to 7, coupled to the airframe, and a propulsion mechanism that is coupled to the airframe and propels the airframe.

Advantageous Effects of Invention

The present invention can provide a safety apparatus including a push-up member in which an ejected object is hardly displaced even during transportation, and an aerial vehicle including the safety apparatus. A movement preventing member of the push-up member can improve a strength of the push-up member as compared with a case without the movement preventing member. In particular, as compared with a metal push-up member, when a push-up member and a movement preventing member made of resin or composite material is used, weight reduction can be achieved while maintaining component strength.

Although the power of the power source to the push-up member and the movement preventing member is reduced by the weight reduction, performance similar to performance before the weight reduction can be maintained. That is, the power source can be also reduced in weight. For example, when the power source is a gas generator, a capacity of a gas generating agent contained in the gas generator can be reduced, and the gas generator can be downsized.

DESCRIPTION OF EMBODIMENT

Hereinafter, a safety apparatus according to an embodiment of the present invention will be described with reference to FIGS. 1 to 4.

Figure 1:
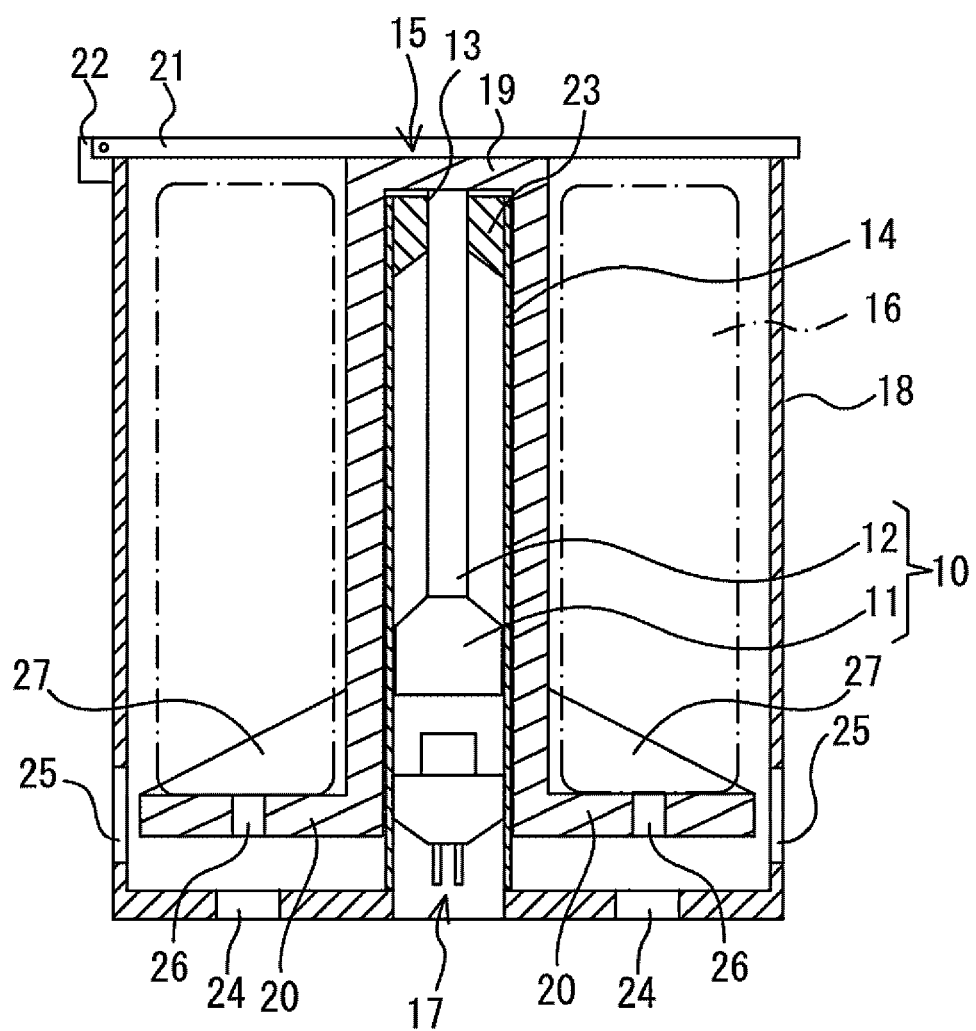
FIG. 1 is a sectional view of a safety apparatus according to an embodiment of the present invention.
Figure 2:
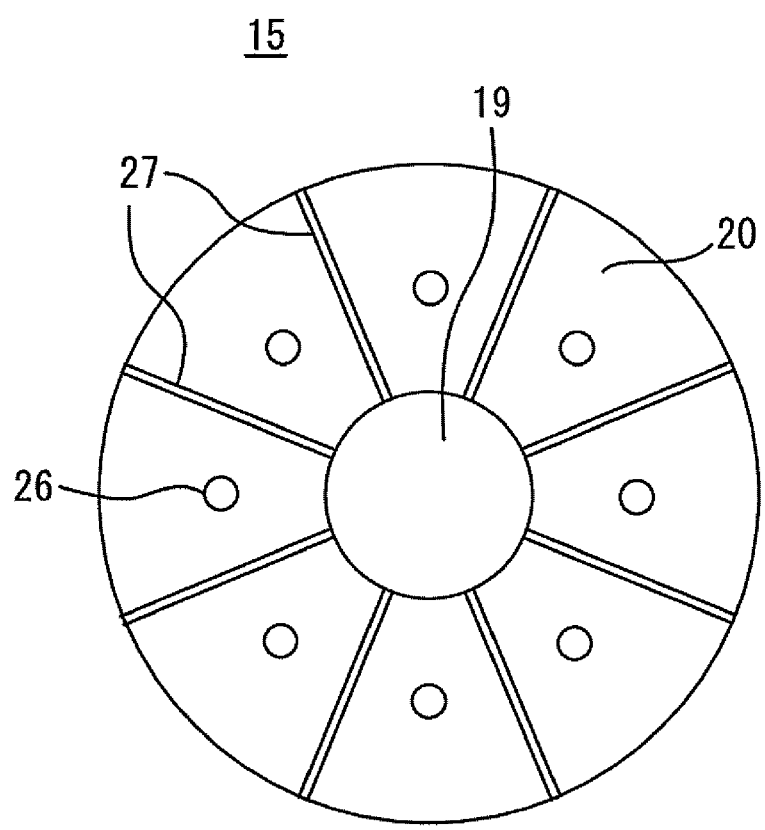
FIG. 2 is a top view of a push-up member in FIG. 1.

As illustrated in FIG. 1, a safety apparatus 100 according to the present embodiment includes at least a piston member 10 as a sliding member, a cylinder 14 that accommodates the piston member 10 and is provided with a bore 13 through which the piston member 10 protrudes to the outside (upward in FIG. 1) during operation, a push-up member 15 that is pushed up in one direction (upward in FIG. 1) by the piston member 10, an ejected object 16 that is pushed up while being supported by the push-up member 15, a gas generator (micro gas generator or the like) 17 as a power source that moves the piston member 10 in the cylinder 14, a bottomed cylindrical container 18 that accommodates the piston member 10, the cylinder 14, the push-up member 15, the ejected object 16, and the gas generator 17, and a lid 21 that closes an opening end of the container 18.

In the present embodiment, the ejected object 16 is a parachute or a paraglider. The gas generator 17 is disposed below a body 11 (described later) of the piston member 10 in a state of being press-fitted, caulked, or welded to an opening end below the cylinder 14. A lower part of the cylinder 14 is fixed to a bottom of the container 18.

The piston member 10 includes the body 11 having a part with an outer diameter substantially equal to an inner diameter of the cylinder 14, and includes a rod 12 connected to the body 11, extending upward, and having a smaller diameter than the body 11. An upper end of the rod 12 is fixed to an inner surface of an upper end of a bottomed cylindrical portion 19 (described later) of the push-up member 15 through the bore 13 of the cylinder 14. A stopper 23 disposed so as to surround a part of the rod 12 of the piston member 10 is provided in an upper inner part of the cylinder 14. That is, the rod 12 is disposed in a state of being inserted through the stopper 23. As a result, when the piston member 10 moves upward, the body 11 comes into contact with the stopper 23 and stops, and thus the body 11 is not released to the outside from the inside of the cylinder 14.

As illustrated in FIG. 1, the push-up member 15 is made of resin, or a composite material of resin and metal, CFRP, a fiber-reinforced resin, or the like. The push-up member 15 includes a bottomed cylindrical portion 19 disposed so as to cover a part of the cylinder 14, that is, an outer part of the cylinder 14 except for a vicinity of the opening end at which the gas generator 17 is disposed, and the push-up member 15 includes a support 20 having a disc shape, provided as a flange at an opening edge of the bottomed cylindrical portion 19, and supporting the ejected object 16. In such a configuration, a bottom of the support 20 is provided apart from an inner surface of the bottom of the container 18 in an initial state. The support 20 has at least one through hole 26 (eight through holes in the present embodiment) for reducing an influence of a negative pressure generated between the bottom of the ejected object 16 and the support 20 during operation to facilitate ejection of the ejected object 16. An outer periphery of the support 20 is formed so as not to be in contact with an inner side of the container 18. At least one movement preventing member 27 (eight members in the present embodiment) that prevents the ejected object 16 from moving in a circumferential direction of the bottomed cylindrical portion 19 is provided on an upper surface of the support 20.

Figure 5:
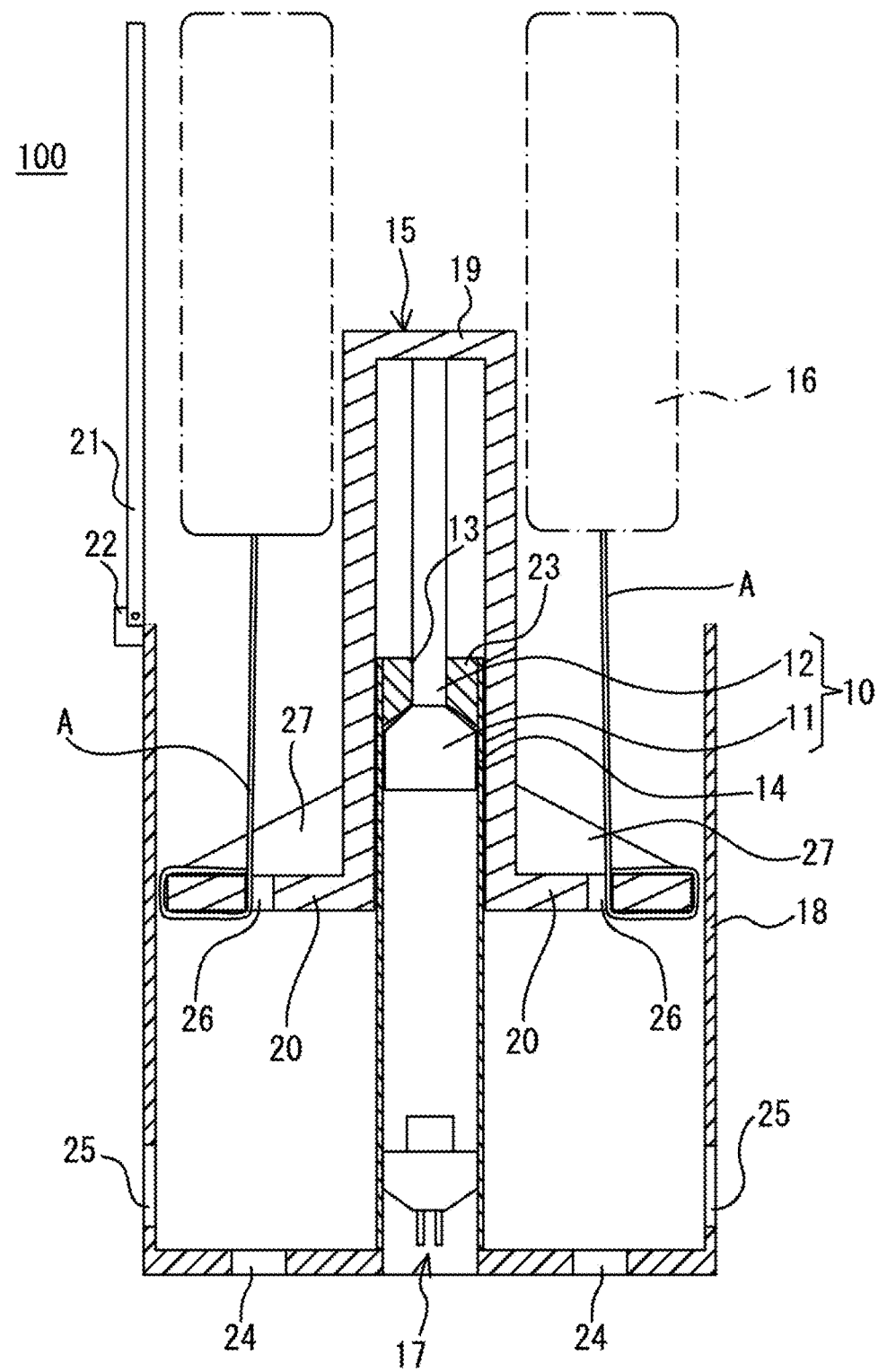
FIG. 5 is a sectional view of a safety apparatus of FIG. 1 in an ejected position.

The movement preventing member 27 is a substantially triangular member made of resin or a composite material of resin and metal, CFRP, a fiber-reinforced resin, or the like, and a plurality of the movement preventing members is provided so as to be rotationally symmetric about the bottomed cylindrical portion 19. The through hole 26 is provided in every space between the movement preventing members 27. As shown in FIG. 5, one end of a coupling member (designated as A) such as a string or a wire is coupled to one or more of the through holes 26, and the ejected object 16 is coupled to the other end of the coupling member.

Therefore, the movement preventing members 27 can improve a strength of the push-up member 15 as compared with a case without the movement preventing members 27. In particular, as compared with a metal push-up member and a metal movement preventing member, when the push-up member 15 and the movement preventing member 27 made of resin, or a composite material of resin and metal, CFRP, a fiber-reinforced resin, or the like are used, weight reduction can be achieved while maintaining component strength.

By the weight reduction of the push-up member 15 made of resin or a composite material of resin and metal, CFRP, a fiber-reinforced resin, or the like as compared with a metal push-up member, the power of the gas generator 17 as a power source such as the push-up member 15 and the movement preventing member 27 is reduced, and performance similar to performance before the weight reduction can be maintained. That is, the gas generator 17 can be also reduced in weight. For example, as compared with a metal push-up member, a capacity of a gas generating agent contained in the gas generator 17 can be reduced, and the gas generator 17 can be downsized.

The lid 21 is provided at a downstream end of the container 18 in an ejection direction of the ejected object 16, that is, an upper end of the container 18. A part of an end of the lid 21 is pivotally supported by a lid opening and closing mechanism 22 so as to be openable and closable. The lid opening and closing mechanism 22 may automatically open the lid 21 by a drive device such as a motor in accordance with operation of the gas generator 17.

As illustrated in FIG. 1, the bottom of the container 18 is provided with a plurality of through holes 24 communicating an inside and an outside of the container 18. A side wall of the container 18 is provided with a plurality of through holes 25 communicating the inside and the outside of the container 18. When the push-up member 15 rapidly moves in the container 18, a negative pressure is generated in a region between the push-up member 15 and a bottom surface of the container 18. The negative pressure makes it difficult to move the push-up member 15. Therefore, by providing the through holes 24 and 25, the phenomenon of negative pressure can be reduced, and the push-up member 15 can be smoothly moved.

The ejected object 16 is accommodated in the container 18 between an inner surface of the container 18 and an outer surface of the bottomed cylindrical portion 19 of the push-up member 15, for example, so as to surround the outer surface of the bottomed cylindrical portion 19. Note that the ejected object 16 is connected to, for example, one end of a string (not shown), and the other end of the string is connected to the inside of the container 18 or an airframe 31 of an aerial vehicle 30 (described later).

As the gas generator 17, only an igniter may be used, or a gas generator including an igniter and a gas generating agent may be used. Alternatively, a hybrid or a stored gas generator that cleaves a sealing plate in a small gas cylinder by a gunpowder igniter and discharges internal gas to the outside may be used. In this case, as a pressurized gas in the gas cylinder, a non-flammable gas such as argon, helium, nitrogen, or carbon dioxide, or a mixture thereof can be used. In order to reliably propel a piston when the pressurized gas is released, the gas generator may be provided with a heating element including a gas generating agent composition, a thermite composition, or the like.

The piston member 10, the cylinder 14, the push-up member 15, the gas generator 17, and the like mainly constitute an ejector that ejects the ejected object 16.

In the above configuration, when the gas generator 17 is operated, for example, at time of a fall of the aerial vehicle or the like equipped with the safety apparatus 100, the piston member 10 is propelled upward in the cylinder 14 by pressure of gas generated by the operation. Thus, the push-up member 15 having the bottomed cylindrical portion 19 connected to the rod 12 of the piston member 10 is propelled upward in the container 18. As a result, the lid 21 is pushed up by an upper part of the push-up member 15 and opened, and the ejected object 16 is ejected to the outside (toward a top of the drawing of FIG. 1) from the inside of the container 18. A parachute as the ejected object 16 or a lift generation member as the paraglider is ejected from the container 18 and then deployed.

Figure 3:
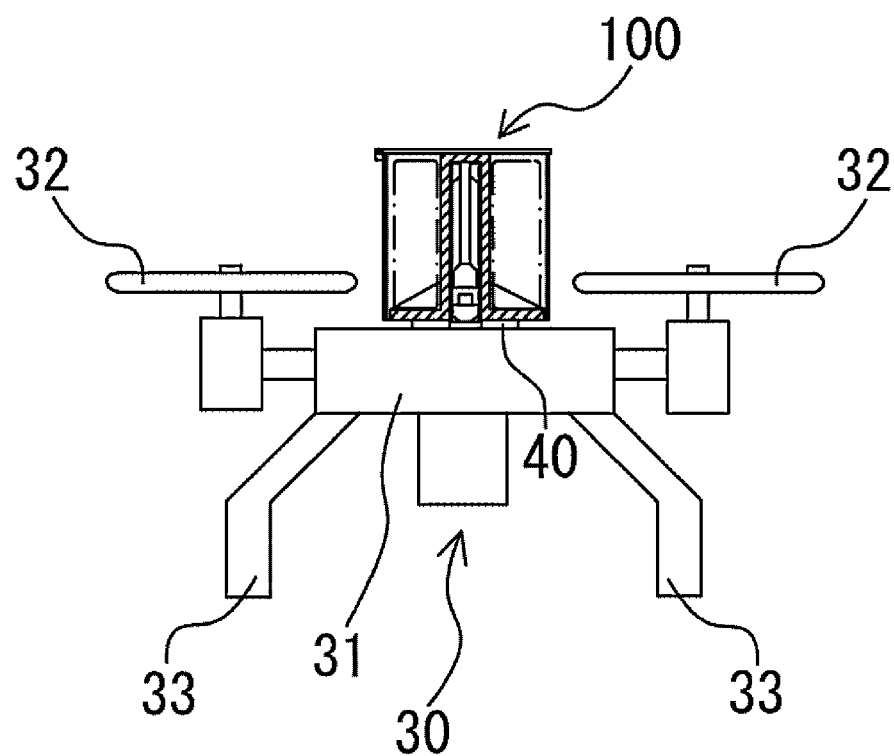
FIG. 3 is a diagram of an aerial vehicle to which the safety apparatus in FIG. 1 is applied.

As illustrated in FIG. 3, the safety apparatus 100 is coupled and fixed to the airframe 31 of the aerial vehicle 30 via a coupling member 40. At this time, as illustrated in FIG. 1, the coupling member 40 couples the container 18 and the airframe 31 at a position not to close the through holes 24. Therefore, the aerial vehicle 30 includes the airframe 31, the safety apparatus 100 joined to the airframe 31, one or more propulsion mechanisms (for example, propellers) 32 joined to the airframe 31 to propel the airframe 31, and a plurality of legs 33 provided in a lower part of the airframe 31. Here, in practice, a socket for energization is fitted to an electrode in a lower part of the gas generator 17, but for convenience of description, the socket is omitted in FIG. 1.

As described above, the present embodiment can provide the safety apparatus 100 including the push-up member 15 in which the ejected object 16 is hardly displaced even during transportation, and the aerial vehicle 30 including the safety apparatus.

The embodiment of the present invention has been described above with reference to the drawings. However, the specific configuration of the present invention should not be interpreted as to be limited to the embodiment. The scope of the present invention is defined not by the above embodiment but by claims set forth below, and shall encompass the equivalents in the meaning of the claims and every modification within the scope of the claims.

For example, the present invention includes the following modifications. In the following modifications, parts denoted by the reference signs having the same last two digits as those in the embodiment are similar to those described in the embodiment, unless otherwise described, and a description thereof will be omitted. Further, components that are not particularly described are similar to those in the embodiment, and thus description and illustration thereof may be omitted. In each of the following modifications, differences from the embodiment will be mainly described in principle. The same applies to the following modifications.

Figure 4:
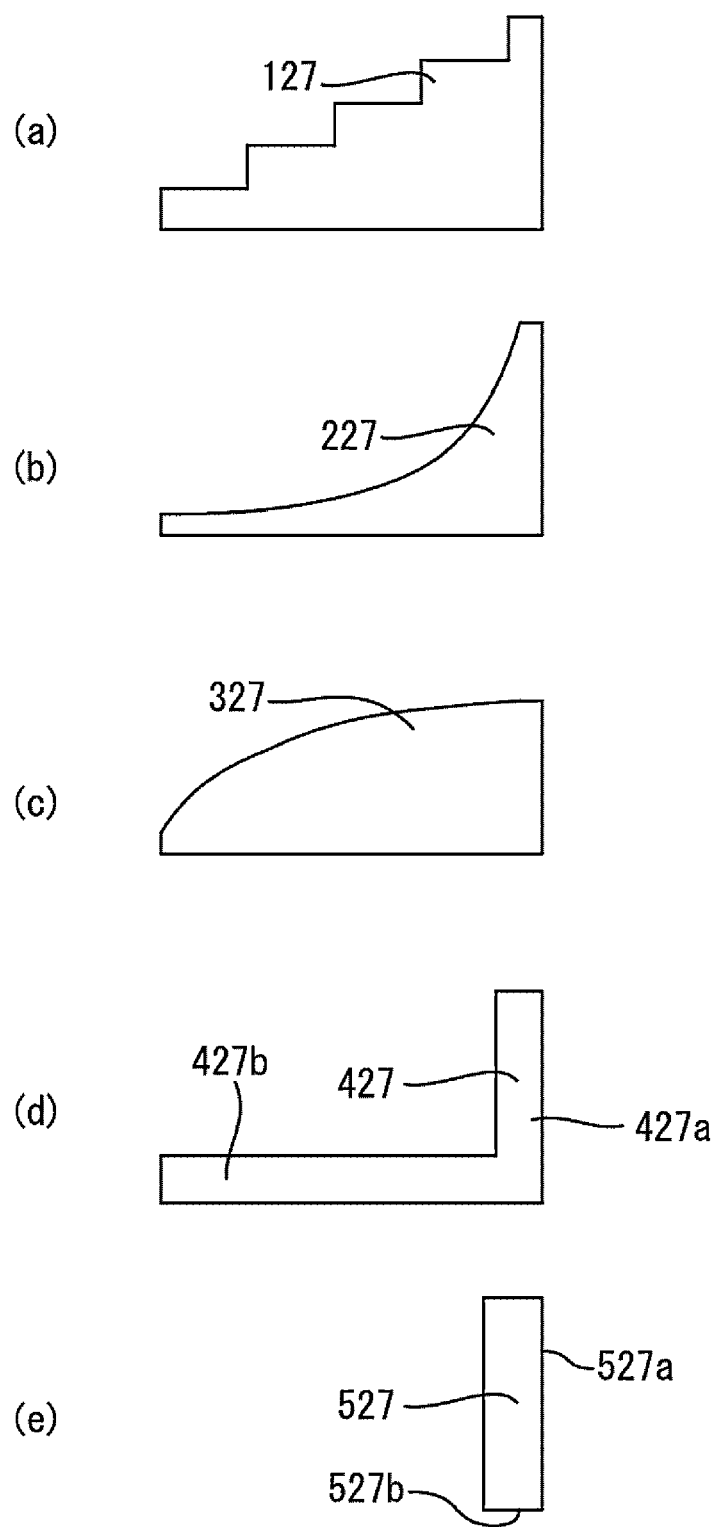
FIG. 4 is a diagram illustrating a modification of a movement preventing member in FIG. 1.

The movement preventing member 27 in the embodiment is a substantially triangular member approximating a right triangle, but is not limited to this. For example, the movement preventing member may be a movement preventing member 127, 227, or 327 as illustrated in FIGS. 4(a) to 4(c) having a substantially triangular shape with an oblique side of various shapes (stair shape, substantially fan shape, substantially cycloidal curve shape, or the like), or may be a substantially L-shaped member 427 (first rod 427a is fixed to the bottomed cylindrical portion of the push-up member, and a second rod 427b is fixed to the support (flange) of the push-up member) as illustrated in FIG. 4(d), a substantially I-shaped protrusion 527 as illustrated in FIG. 4(e), or the like. A surface 527a of the protrusion 527 in FIG. 4(e) is fixed to a side surface of the bottomed cylindrical portion of the push-up member so as to protrude from the side surface. One end 527b of the protrusion 527 may or need not be fixed to the support (flange) of the push-up member. A length of the surface 527a in a longitudinal direction of the drawing of FIG. 4 may be the same as or shorter than a length (height) of the side surface of the bottomed cylindrical portion of the push-up member. The one end 527b extends along a radial direction of the bottomed cylindrical portion of the push-up member, and may have any length as long as the one end 527b does not hinder the installation of the ejected object in the container and can prevent a rotational movement of the ejected object.

In the embodiment, the gas generator is adopted as the power source, but the configuration is not limited as long as the sliding member can apply a driving force for propelling the inside of the cylinder to the sliding member. For example, an elastic body such as a spring may be adopted.

In the embodiment, the container 18 has a cylindrical shape. However, the present invention is not limited to this, and the container 18 may have another shape such as a quadrangular cylinder.

The piston member 10 in the embodiment may be configured as a telescopic structure.

In the embodiment, when a parachute or a paraglider is adopted as the ejected object, the parachute or the paraglider may be packed. The packing is configured to be broken or peeled off during operation.

In the embodiment, the parachute or paraglider have been described as the ejected object, but the present invention is not limited thereto. An ejected object including a lift generation member may be ejected as the ejected object. Examples of the lift generation member include a parafoil, a Rogallo parachute, a single surface parachute, an airplane wing, a propeller, and a balloon. When the lift generation member has a control line, the safety apparatus desirably includes a steering mechanism capable of changing an inclination angle of the ejected lift generation member using the control line. This steering mechanism includes a plurality of reels for winding up a plurality of control lines coupled to the lift generation member and includes a motor serving as power of the reels, for example. By winding up or pulling out the control lines by driving the motor, it is possible to appropriately pull the lift generation member or loosen a tension.

The cylinder, the power source, and the container are preferably coupled or fixed to the airframe by a rubber band, a belt, a string, or other means (mechanical joint, bolt, fastener, or adhesive) in the embodiment.

REFERENCE SIGNS LIST 10 piston member
11 body
12 rod
13 bore
14 cylinder
15 push-up member
16 ejected object
17 gas generator
18 container
19 bottomed cylindrical portion
20 support
21 lid
22 lid opening and closing mechanism
23 stopper
24, 25, 26 through hole
27 movement preventing member
30 aerial vehicle
31 airframe
32 propulsion mechanism
33 leg
40 coupling member
100 safety apparatus
127, 227, 327, 427, 527 movement preventing member
427a first rod
427b second rod
527a surface
527b one end

The invention claimed is:
1. A safety apparatus comprising:
a sliding member;
a cylinder that accommodates the sliding member in an inside and is provided with a bore through which the sliding member protrudes from the inside to an outside during operation;
a push-up member including a bottomed cylindrical portion disposed to cover at least a part of the cylinder and a flange protruding to the outside from an opening or a side surface of the bottomed cylindrical portion, the push-up member being pushed up in one direction by the sliding member;
an ejected object that is pushed up while being supported by the flange of the push-up member;
a power source that moves the sliding member in the cylinder to protrude from the inside to the outside; and
at least one movement preventing member that is fixed to the flange, said at least one movement preventing member protrudes upwardly towards the ejected object and is configured to prevent rotational movement of the ejected object with respect to the bottomed cylindrical portion.

2. The safety apparatus according to claim 1, wherein the movement preventing member is a member having a plate shape and having a triangular shape with an opposite side fixed to at least a part of the bottomed cylindrical portion and an adjacent side fixed to at least a part of the flange,
a L-shaped member having a first rod and a second rod, the first rod being fixed to at least a part of the bottomed cylindrical portion and the second rod being fixed to at least a part of the flange, or
a protruding member fixed to the bottomed cylindrical portion and protruding radially from the bottomed cylindrical portion.

3. The safety apparatus according to claim 2, wherein the triangular shape has an oblique side that is a linear shape, a stair shape, a fan shape, or a cycloidal curve shape.

4. The safety apparatus according to claim 1, wherein a plurality of the movement preventing members is provided to be rotationally symmetric about the bottomed cylindrical portion.

5. The safety apparatus according to claim 1, wherein the flange is provided with at least one through hole.

6. The safety apparatus according to claim 4, wherein the flange is provided with at least one through hole in every space between the plurality of movement preventing members.

7. The safety apparatus according to claim 5 wherein a plurality of the through holes is provided, a coupling member has a first end coupled to the ejected object, and the coupling member has a second end coupled to the flange through one or more of the plurality of through holes.

8. An aerial vehicle comprising:
an airframe;
the safety apparatus according to claim 1, coupled to the airframe; and
a propulsion mechanism that is coupled to the airframe and propels the airframe.

* * * * *